United States Patent
Szeteli et al.

(10) Patent No.: US 11,618,667 B2
(45) Date of Patent: Apr. 4, 2023

(54) REMOVAL SYSTEM

(71) Applicant: AS Strömungstechnik GmbH, Ostfildern (DE)

(72) Inventors: Andreas Szeteli, Filderstadt (DE); Nico Fischer, Filderstadt (DE)

(73) Assignee: AS Strömungstechnik GmbH, Ostfildern (DE)

( * ) Notice: Subject to any disclaimer, the term of this patent is extended or adjusted under 35 U.S.C. 154(b) by 331 days.

(21) Appl. No.: 17/009,815

(22) Filed: Sep. 2, 2020

(65) Prior Publication Data
US 2021/0078850 A1 Mar. 18, 2021

(30) Foreign Application Priority Data
Sep. 12, 2019 (EP) ..................................... 19196864

(51) Int. Cl.
*B67D 7/02* (2010.01)
*F16B 2/16* (2006.01)
*F16B 21/16* (2006.01)

(52) U.S. Cl.
CPC .............. *B67D 7/0294* (2013.01); *F16B 2/16* (2013.01); *F16B 21/165* (2013.01)

(58) Field of Classification Search
CPC ......... B67D 7/0294; F16B 2/16; F16B 21/165
USPC .......................................................... 137/212
See application file for complete search history.

(56) References Cited

U.S. PATENT DOCUMENTS

| | | | | |
|---|---|---|---|---|
| 502,835 | A * | 8/1893 | Snyder | B67D 1/0832 137/212 |
| 4,437,647 | A * | 3/1984 | Cruse | F16L 37/46 285/924 |
| 8,381,768 | B2 * | 2/2013 | Hasegawa | B67D 7/0261 251/149.6 |
| 8,602,270 | B2 * | 12/2013 | Takanohashi | B65D 51/1683 137/212 |

FOREIGN PATENT DOCUMENTS

EP 2848583 B1 3/2015

* cited by examiner

*Primary Examiner* — Angelisa L. Hicks
(74) *Attorney, Agent, or Firm* — Michael Soderman

(57) ABSTRACT

A removal system (1) with an extraction head (2) that may be placed onto an opening of a bottle (3)), wherein the extraction head (2) has a closing means for closing the opening of the bottle (3). In the extraction head (2), a tube (5) is mounted such that when the extraction head (2) is placed onto the opening, the tube (5) projects into the bottle (3) and fluid (4) may be removed from the bottle (3) via the tube (5). An actuation mechanism is provided, by means of which the mounting of the tube (5) in the extraction head (2) may be released.

13 Claims, 4 Drawing Sheets

REMOVAL SYSTEM

CROSS REFERENCE TO RELATED APPLICATIONS

This application claims the priority of EP 19196864.3 filed on 2019 Sep. 12; this application is incorporated by reference herein in its entirety.

BACKGROUND

The invention relates to a removal system.

Such removal systems comprise bottles in which fluids, such as chemicals, are stored, as well as extraction heads that may be fastened to the openings of the bottles, wherein the extraction heads have closing means suitable for this purpose. Such bottles are used in laboratories, for example.

In known removal systems of this type, the extraction head is designed in the form of a simple lid, into which a tube is placed and guided into the internal cavity of the associated bottle. The tube is then connected to a pump in order to pump fluid out of the container.

Once the bottle is emptied, the tube is pulled out of the lid and may be used for removing fluid from another bottle.

The tube may also be introduced through the lid during a change. The lid, with the tube fed through it, is then connected to a new bottle.

A first disadvantage of such a removal system consists in that the bore hole in the lid, through which hole the tube is fed, does not form a leak-tight seal. Therefore, vapors of the fluid stored in the bottle may escape, which is especially serious when toxic chemicals are stored in the bottle.

Another disadvantage is that the tube pulled out of the empty bottle contaminates the fluid in the next bottle into which it is introduced, since fluid residues of the fluid in the first bottle still adhere to it.

Furthermore, it is disadvantageous that a user who pulls the tube out of the bottle is exposed to the adhering fluid.

From EP 2 848 583 B1, a removal system is known in which an extraction head with an immersion pipe may be fastened in a container opening of a container. Fluid may be removed from the container via the immersion pipe.

Such removal systems working with immersion pipes may only be used for larger containers, such as barrels, but not for removal of fluids from bottles. Use of immersion pipes for bottles would necessitate larger structural changes that would impair the respective transport approval.

SUMMARY

The invention relates to a removal system (1) with an extraction head (2) that may be placed onto an opening of a bottle (3)), wherein the extraction head (2) has a closing means for closing the opening of the bottle (3). In the extraction head (2), a tube (5) is mounted such that when the extraction head (2) is placed onto the opening, the tube (5) projects into the bottle (3) and fluid (4) may be removed from the bottle (3) via the tube (5). An actuation mechanism is provided, by means of which the mounting of the tube (5) in the extraction head (2) may be released.

DETAILED DESCRIPTION

The invention seeks to solve the problem of designing a removal system of the type mentioned initially such that it has high functionality yet a simple design structure.

To solve this problem, the features of claim 1 are provided. Advantageous embodiments and expedient further developments of the invention are described in the dependent claims.

The invention relates to a removal system with an extraction head that may be placed onto an opening of a bottle, wherein the extraction head has a closing means for closing the opening of the bottle. In the extraction head, a tube is mounted such that when the extraction head is placed onto the opening, the tube projects into the bottle and fluid may be removed from the bottle via the tube. An actuation mechanism is provided, by means of which the mounting of the tube within the extraction head may be released.

With the removal system according to the invention, the extraction head, with a tube fastened to it, is placed onto an opening of a bottle containing a fluid and fastened to the opening with the closing means.

A first essential advantage of the removal system according to the invention is that the extraction head with the tube fastened to it forms a hermetically sealed unit, such that when the extraction head is fastened to the opening of the bottle with the closing means and then fluid is removed from the bottle, no vapors may escape from the bottle. This is especially advantageous when toxic chemicals are stored in the bottle. Contamination present in the ambient air is also prevented from entering the bottle.

Another essential advantage of the removal system according to the invention is that the extraction head with the tube fastened to it may be fastened onto the opening of the bottle as a ready-for-use assembly. Then, fluid may be directly removed from the bottle via the tube projecting into the bottle, the extraction head being advantageously connected to a pump for this purpose, by means of which fluid is suctioned out of the bottle.

An essential aspect of the invention is that the tube is mounted releasably and thus replaceably at the extraction head. According to the invention, for releasing and fastening the tube on the extraction head, an actuation mechanism is provided on the extraction head.

If an extraction head has been placed onto a bottle and the fluid contained therein has been removed from it via the tube, then the actuation mechanism on the extraction head is actuated, which causes the tube on the extraction head to be released. The tube then falls into the empty container and is disposed of as a disposable part.

If the extraction head is used to empty another bottle, a new tube is fastened on the extraction head by simple actuation of the actuation mechanism. In this way, a ready-for-use assembly is again obtained, which is fastened onto the opening of the other bottle, such that fluid may be removed from this bottle.

An essential advantage of the removal system according to the invention is therefore that, with the tube as a disposable part which is releasably fastened on the extraction head, contamination may be easily avoided during multiple use of the extraction head. The tube fastened to the extraction head is only used once to empty a bottle and is then left in this bottle by operating the actuation mechanism on the extraction head. This prevents the tube from contaminating the fluid in the bottle that is emptied next, since for the latter, a new tube is fastened to the extraction head. A contamination-free method for emptying bottles is therefore provided. The replaceable tubes are extremely cost-effective and they are particularly composed of plastic pieces. The use of separate tubes for emptying the bottles therefore does not result in appreciable increase in the manufacturing costs of the removal system.

According to an advantageous embodiment of the invention, the extraction head has locking means that secure the tube in a locking position within the extraction head. By means of the actuation mechanism, the locking means may be moved into a release position, in which they release the tube.

The locking means represent mechanical units that may be moved from the locking position into the release position, or vice versa, by operating the actuation mechanism.

It is especially advantageous for the actuation mechanism to be a purely mechanical unit by means of which actuation movements are generated that may be directly transmitted to the locking means.

As such, a locking and unlocking mechanism with a simple design for the tube is created.

According to an embodiment of the invention that is advantageous from a design perspective, the locking means are formed by balls that are displaceably mounted in bore holes of a guide channel. The tube may be guided inside the guide channel. In the locking position, the balls are pressed against the tube with a pressing force, by means of which the tube is secured in place. In the release position, the balls are released from the tube.

These locking means are implemented in a simple design and ensure reliable locking and unlocking of the tube.

It is especially advantageous for bore holes to be arranged equidistant in the circumferential direction within the guide channel, extending in the radial direction, one ball being guided in every bore hole. The bore holes and balls are respectively identically formed and are oriented in a plane extending perpendicular to the longitudinal axis of the guide channel.

Since the balls for locking the tube within the bore holes are moved in the radial direction and therefore are directly moved toward the tube, there is good transmission of force from the balls onto the tube, and therefore, reliable locking.

Due to the identical form of the bore holes, the balls, and their rotationally symmetrical arrangement within the guide channel, and therefore relative to the tube, even transmission of force onto the tube results on all sides, by means of which especially efficient, reliable locking is achieved.

It is further advantageous for each bore hole, at its opening out into the guide channel, to be constricted to a diameter that is smaller than the diameter of the balls guided in the guide channel.

In this way, the balls are prevented in a straightforward way from falling out of the bore holes when the tube is released out of the guide channel and the guide channel is therefore empty.

According to an advantageous embodiment of the invention, the guide channel is displaceable relative to the locking means.

In general, the guide channel may be a component of a head piece that is displaceable relative to the closing means.

In this embodiment, in a locking position of the closing means, relative to the guide channel, positioning means on the closing means press the locking means in the bore holes against the tube and secure the latter in the guide channel. In a release position of the closing means, relative to the guide channel, the positioning means are out of engagement with the locking means, such that the tube is released from out of the guide channel.

The positioning means are preferably arranged on the closing means. For example, projections, latching stops or latching lugs may be provided as positioning means, which in particular may be components of the closing means and may be formed as a single piece with it. Such positioning means have an especially simple design. Furthermore, by means of such positioning means, an especially simple and direct coupling of the actuation mechanism to the locking means is realized.

In general, the positioning means are controlled by the actuation mechanism. This occurs especially simply such that when the actuation mechanism is not operated by a user, the positioning means provide securing of the tube in the locking position of the closing means. By operating the actuation mechanism, the positioning means are brought out of engagement with the locking means.

According to a first variant of the invention, the actuation mechanism is a spring mechanism. In this case, the head piece is held in the locking position relative to the closing means by the spring force of a spring. Displacement into the release position is done by pressing the head piece onto the closing means against the spring force of the spring.

The functional principle of this variant of the removal system is therefore such that the spring force of the spring provides securing of the tube on the extraction head.

To release the tube, a user must operate the actuation mechanism by pressing the head piece against the closing means. Also, in this way, a new tube may be secured on the extraction head.

According to a second variant of the invention, the closing means forms the actuation mechanism. In this case in particular, the closing means is designed in the form of a screw top.

In this case, when the screw top is released, it is pushed upwards and thereby releases the balls or generally the locking means.

In this variant as well, the tube is secured on the extraction head when the actuation mechanism is not actuated. The tube is released from the extraction head only when the actuation mechanism is actively operated by a user.

In this case, the closing means is formed such that when the closing means is opened, when the extraction head is removed from the bottle, the tube is released in the guide channel by means of this opening movement.

In the case of a closing means in the form of a screw top, its thread is structured such that when the screw top is unscrewed, it executes a relative movement relative to the guide channel and thereby moves the positioning means from the locking position into the release position. This may be realized by a catch on the thread and/or by a special structuring of the thread as a partial thread.

BRIEF DESCRIPTION OF THE DRAWINGS

The invention is explained below based on the drawings. They show.

DETAILED DESCRIPTION OF THE PREFERRED EMBODIMENTS

Figure 1:
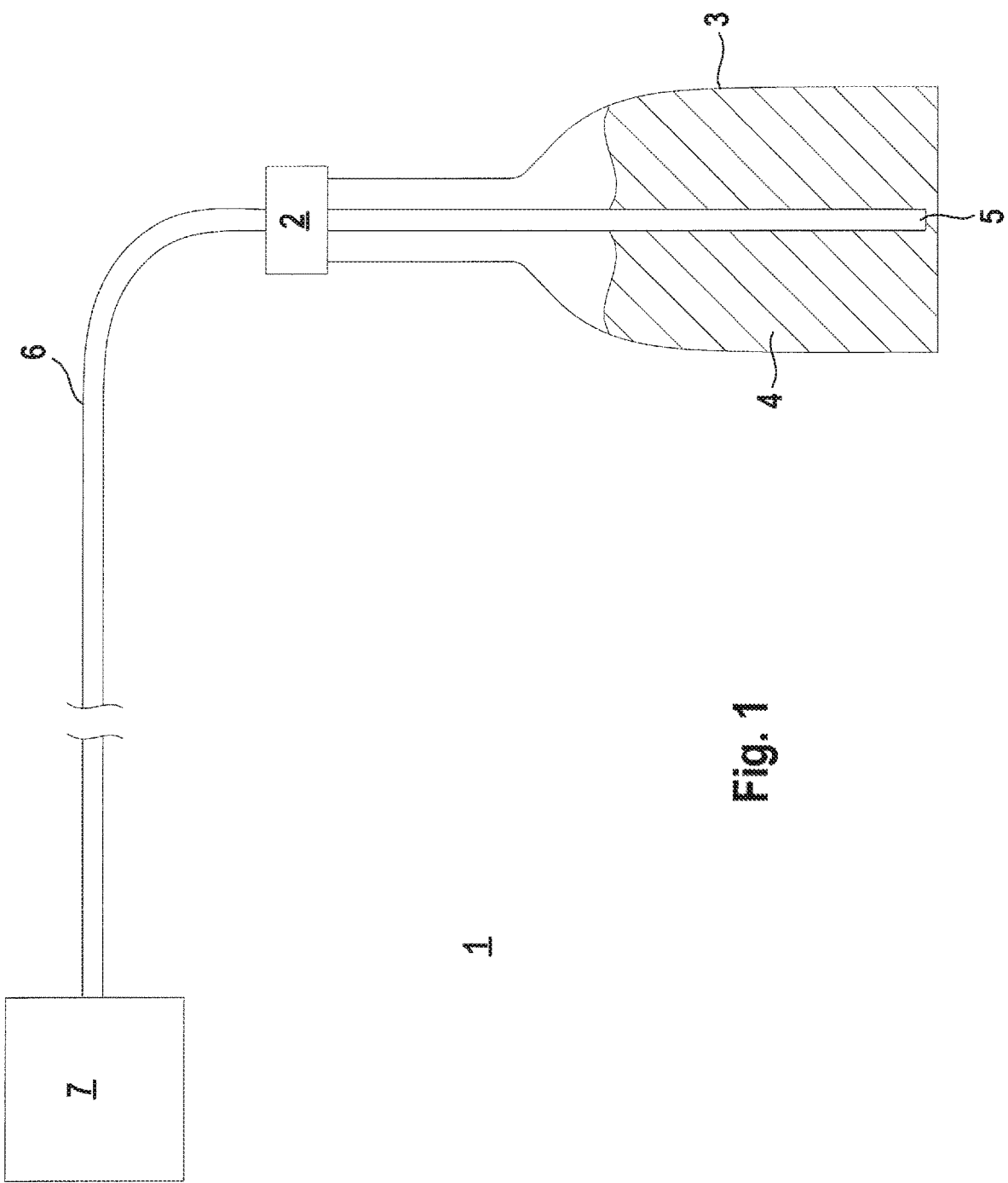
FIG. 1: Schematic representation of the removal system according to the invention.

FIG. 1 shows schematically an exemplary embodiment of the removal system 1 according to the invention.

The removal system 1 comprises an extraction head 2, that may be placed onto an opening of a bottle 3, which contains a fluid 4. On the extraction head 2, a tube 5 is mounted that runs from the extraction head 2 into the interior cavity of the bottle 3.

The extraction head 2 is further connected to a pump 7 via a line 6. Fluid 4 is pumped out of the bottle 3 by means of the pump 7. The fluid 4 is removed from the bottle 3 via the tube 5 and then fed into the line 6.

Figure 2:
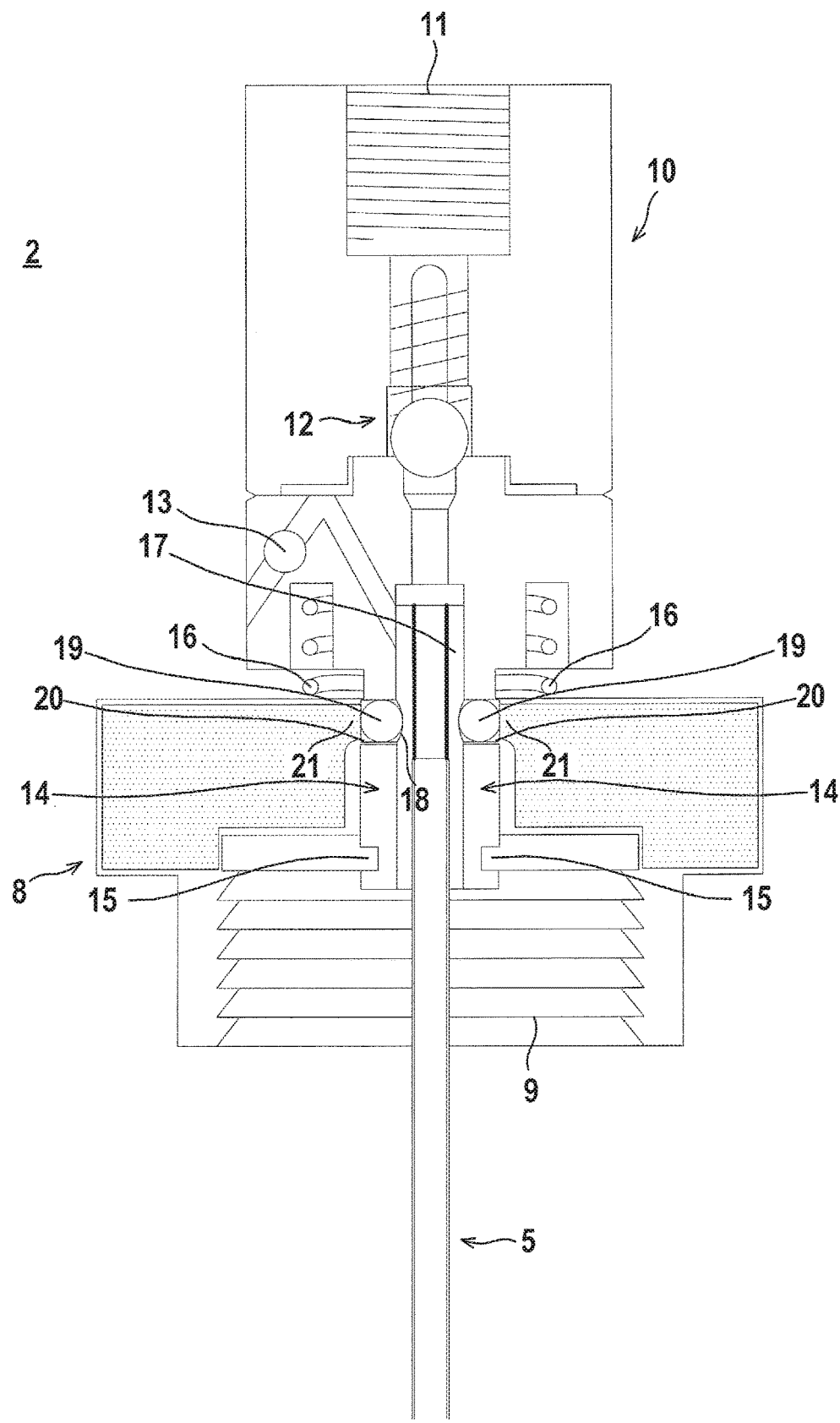
FIG. 2: Extraction head of the removal system according to FIG. 1 with a tube locked therein.
Figure 3:
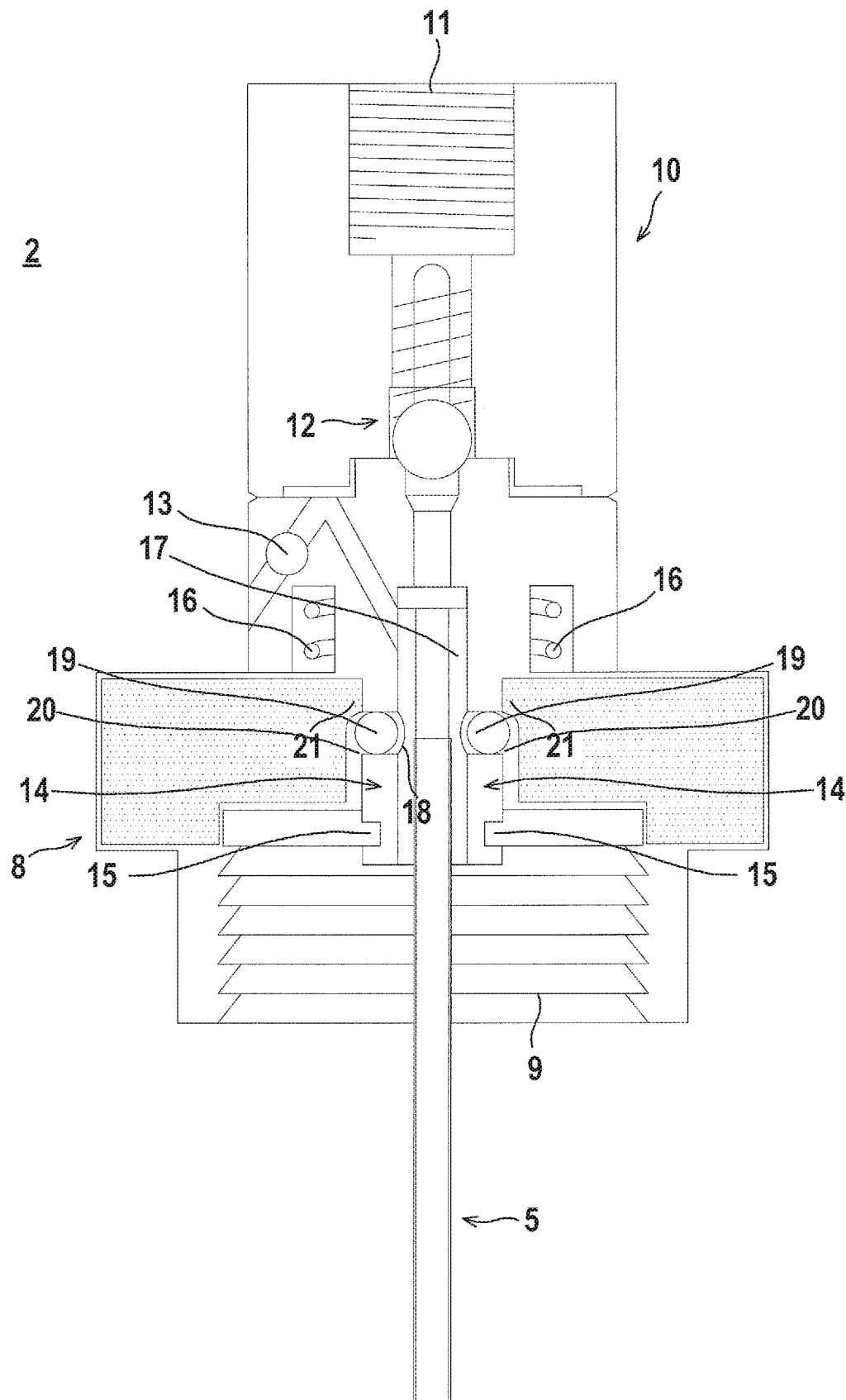
FIG. 3: Extraction head of the removal system according to FIG. 1 with the unlocked tube arranged therein.
Figure 4:
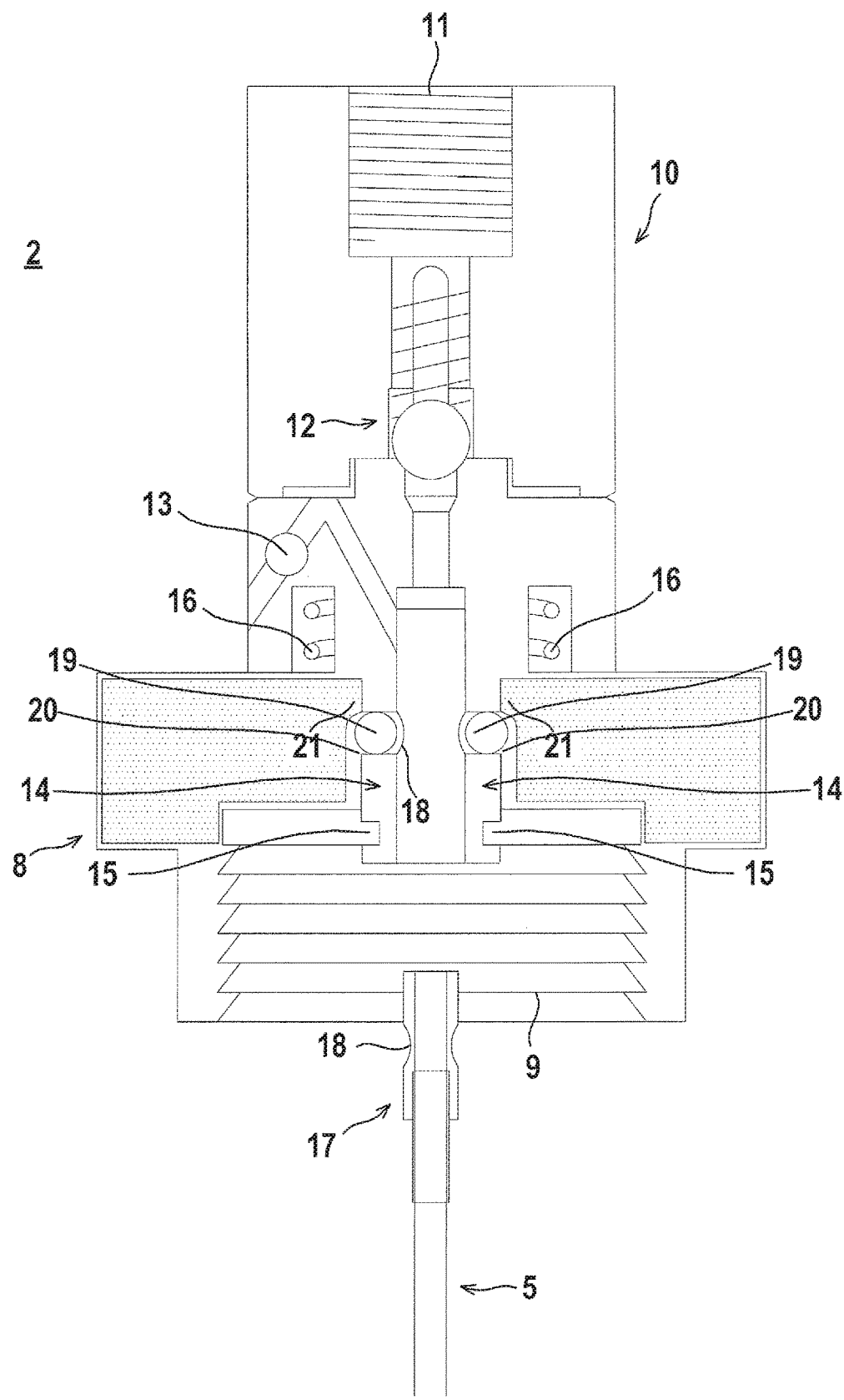
FIG. 4: Extraction head of the removal system according to FIG. 1 with the tube falling out of the extraction head.

FIGS. 2-4 show an exemplary embodiment of the extraction head 2 according to the invention. The extraction head 2 has a closing means 8 in the form of a screw top, by means of which the extraction head 2 may be secured on the opening of a bottle 3. The screw top has an internal thread 9 that may be screwed onto a thread on the opening of the bottle 3. Due to the screw top of the extraction head 2, a leak-tight seal of the opening of the bottle 3 results.

Furthermore, the extraction head 2 has a head piece 10. At the upper end of the head piece 10, a connection 11 is provided at which the line 6 leading to the pump 7 may be connected. The connection 11 is secured by a check valve 12. The check valve 12 prevents fluid from escaping from the line 6. Furthermore, in the head piece 10, a ball valve 13 is provided, by means of which an air and pressure equalization is effected in the bottle 3.

A guide channel 14 opens out at the bottom of the head piece 10, which guide channel 14 projects into a central recess in the closing means 8, wherein the lower end of the guide channel 14 is secured with fastening means 15 within the closing means 8. The guide channel 14 is hollow and cylindrical in form.

The head piece 10 is movable relative to the screw top forming the closing means 8, an actuation mechanism being formed in this case.

A spring 16 is arranged between the head piece 10 and the screw top. The head piece 10 is held at a distance from the top of the locking means 8 (FIG. 2) by the spring force of the spring 16. If a user actuates the actuation mechanism formed in this manner, he presses on the upper end of the head piece 10 and presses it down, until the bottom of the head piece 10 lies on the top of the closing means 8 (FIGS. 3 and 4).

FIG. 2 shows the extraction head 2 with a non-actuated actuation mechanism. The tube 5 is mounted in the inner cavity of the guide channel 14 and held in position there with locking means.

As is evident from FIGS. 2-4, the upper end of the tube 5, which is insertable into the guide channel 14, is provided with a sleeve 17 that has a circumferential groove 18 extending in circumferential direction.

The locking means are formed by balls 19 that are guided in bore holes 20 within the guide channel 14. In the present case, four identical bore holes 20 are provided in a plane perpendicular to the longitudinal axis of the guide channel 14, which bore holes 20 are respectively arranged offset by 90° to one another in circumferential direction. The bore holes 20 extend in radial direction within the guide channel 14. A ball 19 is guided in each bore hole 20, whereby all balls 19 are identical in form. The balls 19 are guided in the respective bore holes 20 with little play.

The diameters of the bore holes 20 are somewhat constricted in the region of the opening out into the guide channel 14, i.e. are somewhat smaller than the ball diameter, such that the balls 19 are prevented from falling out into the empty guide channel 14.

As is evident from FIGS. 2-4, a projection 21 is provided at the upper edge of the wall element of the closing means 8 that delimits the recess, which projection 21 runs circumferentially in circumferential direction and represents a narrowing of the recess into which the guide channel 14 projects. This projection 21 forms a positioning means, FIG. 2 showing the closing means 8 and the positioning means in a locking position. This locking position is adopted when the actuation mechanism is not actuated and the spring 16 holds the head piece 10 at a distance from the closing means 8. The projection 21 forming the positioning means then lies, as shown in FIG. 2, in the region of the bore holes 20. The projection 21 therefore pushes the balls 19 in the bore holes 20 in the direction of the interior cavity of the guide channel 14, such that in a locking position, the balls 19 are pressed against the groove 18 in the sleeve 17 of the tube 5 with a pressing force, by means of which the tube 5 is secured within the guide channel 14.

When the actuation mechanism is actuated as shown in FIG. 3, the head piece 10 is pressed against the screw top forming the closing means 8 and the guide channel 14 is pushed further into the recess of the screw top. Therefore, the closing means 8 and with it, the projection 21, are moved from the locking position into a release position. In this release position, the projection 21 lies above the bore holes 20. The balls 19 are therefore in a released position and are therefore no longer pressed against the tube 5 by means of the projection 21, i.e. the tube 5 is no longer held securely inside the guide channel 14. Therefore, due to gravity, the tube 5 falls out of the guide channel 14 (FIG. 4) and falls into the bottle 3.

To empty the bottle 3, the extraction head 2 is fastened to the bottle 3. The actuation mechanism is not actuated and the tube 5 is held securely inside the guide channel 14 (FIG. 2). The bottle 3 is then emptied by means of the pump 7. Once the bottle 3 is empty, the actuation mechanism is actuated and the tube 5 inside the guide channel 14 is released (FIG. 3), such that the tube 5 falls into the empty bottle 3 and may be disposed of.

If the extraction head 2 is to be used for removing fluid 4 from another bottle 3, first a new tube 5 is fastened inside the guide channel 14 of the extraction head 2.

To do so, a user actuates the actuation mechanism and then slides the tube 5 into the guide channel 14. Then the user releases the head piece 10, such that the head piece 10 is raised up from the closing means 8 by the spring force of the spring 16. The closing means 8, with its projection 21, is then moved into the locking position, by means of which the tube 5 is held securely inside the guide channel 14.

The assembly formed in this manner may then be placed onto the other bottle 3 for removing fluid 4.

LIST OF REFERENCE NUMERALS (1) Removal system
(2) Extraction head
(3) Bottle
(4) Fluid
(5) Tube
(6) Line
(7) Pump
(8) Closing means
(9) Internal thread
(10) Head piece
(11) Connection
(12) Check valve
(13) Ball valve
(14) Guide channel
(15) Fastening means
(16) Spring
(17) Sleeve

(18) Groove
(19) Ball
(20) Bore hole
(21) Projection

The invention claimed is:

1. A removal system (1) with an extraction head (2) that may be placed onto an opening of a bottle (3), wherein the extraction head (2) has a closing means for closing the opening of the bottle (3), characterized in that in the extraction head (2), a tube (5) is mounted such that when the extraction head (2) is placed onto the opening, the tube (5) projects into the bottle (3) and fluid (4) may be removed from the bottle (3) via the tube (5), and that an actuation mechanism is provided, by means of which the mounting of the tube (5) in the extraction head (2) may be released, wherein the extraction head (2) has locking means that secure the tube (5) in the extraction head (2) in a locking position,
the locking means may be moved into a release position by means of the actuation mechanism, in which they release the tube (5),
the locking means are formed by balls (19) that are displaceably mounted in bore holes (20) of a guide channel (14), the tube (5) being able to be guided inside the guide channel (14),
the guide channel (14) is displaceable relative to the closing means (8), and in a locking position of the closing means (8) relative to the guide channel (14), positioning means on the closing means (8) press the locking means in the bore holes (20) against the tube (5) and secure it inside the guide channel (14).

2. The removal system (1) according to claim 1, characterized in that, in the locking position, the balls (19) are pressed against the tube (5) with a pressing force, by means of which the tube (5) is secured in place, and in that, in the release position, the balls (19) are released from the tube (5).

3. The removal system (1) according to claim 1, characterized in that in the guide channel (14), bore holes (20) arranged equidistant in circumferential direction extending in radial direction are provided, wherein a ball (19) is guided in each bore hole (20).

4. The removal system (1) according to claim 3, characterized in that each bore hole (20), at its opening out in the guide channel (14), is constricted to a diameter that is smaller than the diameter of the balls (19) guided in the guide channel (14).

5. The removal system (1) according to claim 1, characterized in that the bore holes (20) and balls (19) are respectively formed identically and are oriented in a plane extending perpendicular to the longitudinal axis of the guide channel (14).

6. The removal system (1) according to claim 1, characterized in that the guide channel (14) is a component of a head piece (10) that is displaceable relative to the closing means (8).

7. A removal system (1) with an extraction head (2) that may be placed onto an opening of a bottle (3), wherein the extraction head (2) has a closing means for closing the opening of the bottle (3), characterized in that in the extraction head (2), a tube (5) is mounted such that when the extraction head (2) is placed onto the opening, the tube (5) projects into the bottle (3) and fluid (4) may be removed from the bottle (3) via the tube (5), and that an actuation mechanism is provided, by means of which the mounting of the tube (5) in the extraction head (2) may be released, wherein
the extraction head (2) has locking means that secure the tube (5) in the extraction head (2) in a locking position,
the locking means may be moved into a release position by means of the actuation mechanism, in which they release the tube (5),
the locking means are formed by balls (19) that are displaceably mounted in bore holes (20) of a guide channel (14), the tube (5) being able to be guided inside the guide channel (14),
the guide channel (14) is displaceable relative to the closing means (8), and in a locking position of the closing means (8) relative to the guide channel (14), positioning means on the closing means (8) press the locking means in the bore holes (20) against the tube (5) and secure it inside the guide channel (14), wherein
in a release position of the closing means (8) relative to the guide channel (14), the positioning means are out of engagement with the locking means, such that the tube (5) is released from the guide channel (14).

8. The removal system (1) according to claim 1, characterized in that the actuation mechanism is a spring mechanism.

9. The removal system (1) according to claim 8, characterized in that the head piece (10) is held in the release position relative to the closing means (8) by means of the spring force of a spring (16).

10. The removal system (1) according to claim 9, characterized in that the transition into the locking position occurs by pressing the head piece (10) onto the closing means (8) against the spring force of the spring (16).

11. The removal system (1) according to claim 1, characterized in that the closing means (8) forms the actuation mechanism.

12. The removal system (1) according to claim 1, characterized in that the closing means (8) is implemented in the form of a screw top.

13. A removal system (1) with an extraction head (2) that may be placed onto an opening of a bottle (3), wherein the extraction head (2) has a closing means for closing the opening of the bottle (3), characterized in that in the extraction head (2), a tube (5) is mounted such that when the extraction head (2) is placed onto the opening, the tube (5) projects into the bottle (3) and fluid (4) may be removed from the bottle (3) via the tube (5), and that an actuation mechanism is provided, by means of which the mounting of the tube (5) in the extraction head (2) may be released, wherein
the closing means (8) is implemented in the form of a screw top, and
the balls (19) are released by an upward movement of the screw top.

* * * * *